United States Patent
Gilra et al.

(10) Patent No.: US 11,599,218 B2
(45) Date of Patent: Mar. 7, 2023

(54) CUSTOMIZING A TOUCH INPUT PRESSURE SENSITIVITY VIA A CONTINUOUS-VARIABLE INPUT ELEMENT

(71) Applicant: Adobe Inc., San Jose, CA (US)

(72) Inventors: Anant Gilra, San Jose, CA (US); Walter Michael Shaw, Fremont, CA (US)

(73) Assignee: Adobe Inc., San Jose, CA (US)

( * ) Notice: Subject to any disclaimer, the term of this patent is extended or adjusted under 35 U.S.C. 154(b) by 261 days.

(21) Appl. No.: 17/004,561

(22) Filed: Aug. 27, 2020

(65) Prior Publication Data

US 2022/0066589 A1     Mar. 3, 2022

(51) Int. Cl.
*G06F 3/041*     (2006.01)
*G06F 3/04842*   (2022.01)
*G06F 3/04847*   (2022.01)
*G06F 3/04883*   (2022.01)

(52) U.S. Cl.
CPC .......... *G06F 3/0414* (2013.01); *G06F 3/0416* (2013.01); *G06F 3/04842* (2013.01); *G06F 3/04847* (2013.01); *G06F 3/04883* (2013.01)

(58) Field of Classification Search
CPC .. G06F 3/0414; G06F 3/0416; G06F 3/04842; G06F 3/04847; G06F 3/04883
See application file for complete search history.

(56) References Cited

U.S. PATENT DOCUMENTS

| | | | |
|---|---|---|---|
| 7,619,616 B2* | 11/2009 | Rimas Ribikauskas | G06F 3/04847 345/157 |
| 8,599,213 B2* | 12/2013 | DiVerdi | G06T 11/40 345/589 |
| 9,436,303 B2* | 9/2016 | Hirata | G06F 3/04144 |
| 10,359,865 B2* | 7/2019 | Yamada | G06F 3/03545 |
| 2006/0132457 A1* | 6/2006 | Rimas-Ribikauskas | G06F 3/04812 345/173 |
| 2008/0024459 A1* | 1/2008 | Poupyrev | G06F 3/0488 345/173 |
| 2013/0120394 A1* | 5/2013 | DiVerdi | G06T 11/40 345/441 |
| 2013/0120435 A1* | 5/2013 | DiVerdi | G06T 11/40 345/594 |
| 2018/0129314 A1* | 5/2018 | Yamada | G06F 3/0383 |
| 2019/0244403 A1* | 8/2019 | Shaw | G06T 11/60 |

* cited by examiner

*Primary Examiner* — Shen Shiau
(74) *Attorney, Agent, or Firm* — Keller Preece PLLC

(57) ABSTRACT

Methods, systems, and non-transitory computer readable storage media are disclosed for provide a continuous-variable input element for customizing pressure sensitivity for a touch-based input. For instance, the disclosed system utilizes an input element value corresponding to a position of the continuous-variable input element to determine a plurality of variables of a pressure sensitivity curve. The disclosed system determines an exponent of an exponential curve function and an ending value for the exponential curve function based on the input element value. Additionally, the disclosed systems generates the pressure sensitivity curve utilizing the exponential curve function. The disclosed system uses the pressure sensitivity curve to determine a display output of a graphical user interface tool in response to a pressure of an input.

20 Claims, 11 Drawing Sheets

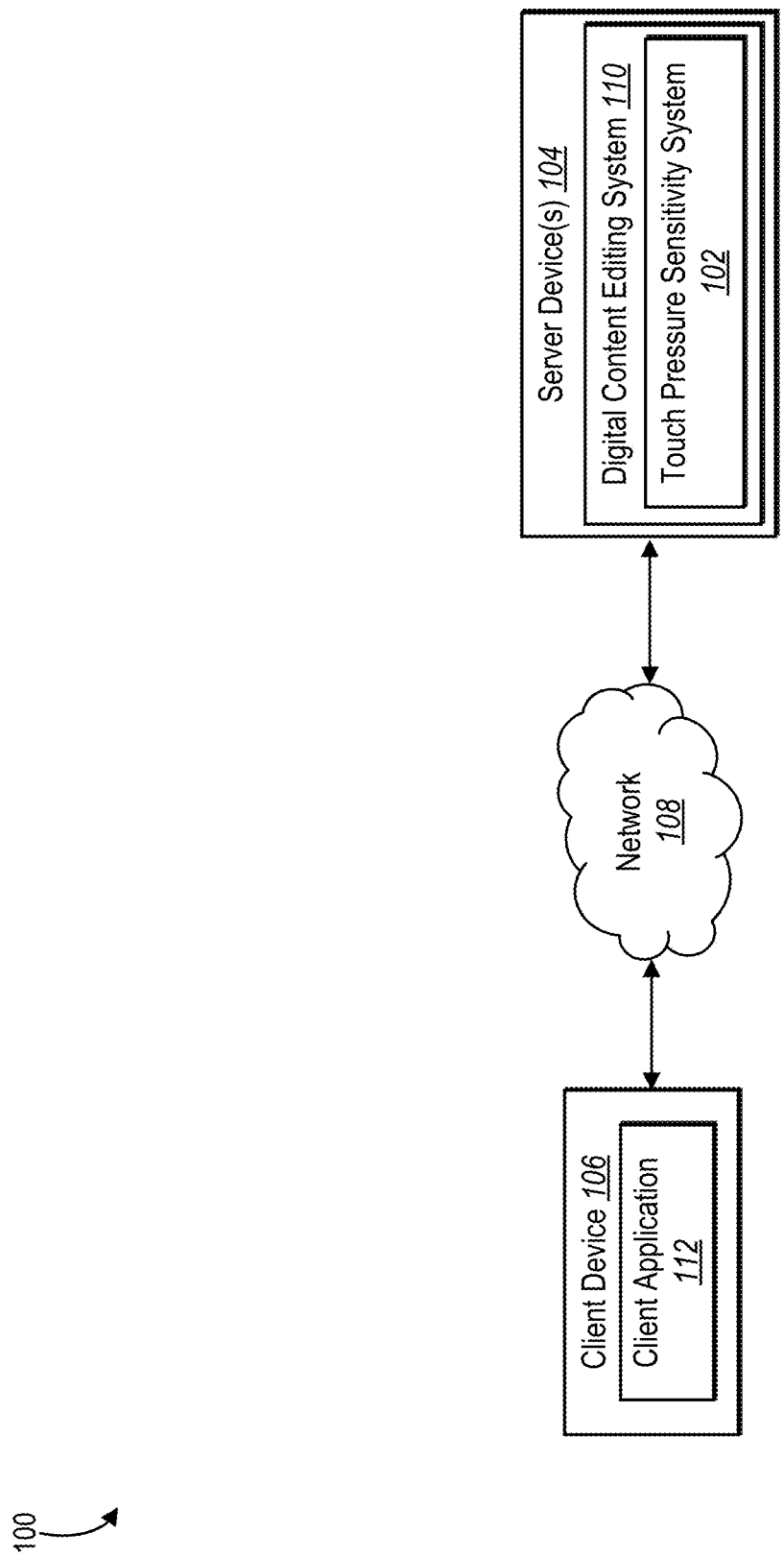

Input Element Value = 0.25
Ending Value = 0.87
Power Coefficient = 1.694

Input Element Value = 0.14
Ending Value = 0.84
Power Coefficient = 2

Input Element Value = 0
Ending Value = 0.79
Power Coefficient = 2.39

Input Element Value = 0.5
Ending Value = 0.96
Power Coefficient = 1

Input Element Value = 0.75
Ending Value = 0.98
Power Coefficient = 0.825

Input Element Value = 1
Ending Value = 1
Power Coefficient = 0.65

CUSTOMIZING A TOUCH INPUT PRESSURE SENSITIVITY VIA A CONTINUOUS-VARIABLE INPUT ELEMENT

BACKGROUND

Based on recent improvements to digital rendering and digital input capabilities in computing devices, many computing systems include display devices capable of receiving touch inputs, such as via a stylus pen or finger. Different users may have unique styles of using touch input to interact with a computing device, such as by using different input devices (e.g., different stylus pens and/or different fingers) or by applying different amounts of pressure. To account for different user input preferences, some conventional systems provide customizable touch input settings to allow users to customize how a device reacts to touch inputs. Unfortunately, such input setting typically require manipulating complex curves thereby limiting effective use to only expert users.

SUMMARY

This disclosure describes one or more embodiments of methods, non-transitory computer readable media, and systems that solve the foregoing problems in addition to providing other benefits. In particular, the disclosed systems provide a continuous-variable input element for customizing pressure sensitivity for a touch-based input. For instance, the disclosed systems utilize a single input element value corresponding to a position of the continuous-variable input element to determine a plurality of variables of a pressure sensitivity curve. To illustrate, the disclosed systems determine an exponent of an exponential curve function based on the input element value. The disclosed systems then generate the pressure sensitivity curve utilizing the exponential curve function. The disclosed systems use the pressure sensitivity curve to determine a display output of a graphical user interface tool in response to a pressure of a touch-based input. Accordingly, the disclosed systems provide a flexible, efficient tool for customizing the pressure sensitivity of a touch-based input to a computing device.

BRIEF DESCRIPTION OF THE DRAWINGS

The detailed description refers to the drawings briefly described below.

FIG. 1 illustrates a block diagram of a system environment in which a touch pressure sensitivity system can operate in accordance with one or more implementations.

DETAILED DESCRIPTION

Figure 2B:
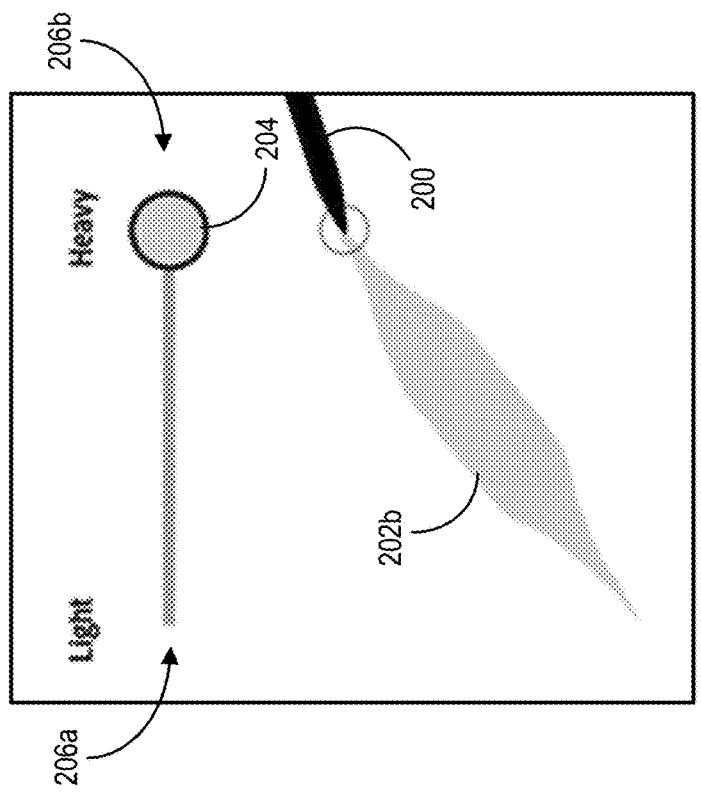
FIGS. 2A-2B illustrate diagrams of display outputs of a graphical user interface tool based on input pressure in accordance with one or more implementations.

This disclosure describes one or more embodiments of a touch pressure sensitivity system that customizes pressure sensitivity of touch-based input to computing devices by utilizing an exponential curve function. Specifically, the touch pressure sensitivity system provides a continuous-variable input element (e.g., a slider element) for customizing a pressure sensitivity of a touch-based input (e.g., a stylus pen). For example, the touch pressure sensitivity system determines an input element value based on a position of the continuous-value input element. In one or more embodiments, the touch pressure sensitivity system then uses the determined input element value to determine an exponential curve function. Additionally, the touch pressure sensitivity system generates a pressure sensitivity curve based on the exponential curve function and one or more additional variables based on the input element value. The touch pressure sensitivity system then determines a display output of a graphical user interface tool according to the pressure sensitivity curve in response to a corresponding touch-based input.

As mentioned, in one or more embodiments, the touch pressure sensitivity system provides a continuous-variable input element within a graphical user interface. For instance, the continuous-value input element includes a slider element or a dial element that has a modifiable position within the graphical user interface. Different positions of the continuous-value input element correspond to different input element values associated with a pressure sensitivity of a graphical user interface tool. Thus, changing the position of the continuous-value input element also changes an input element value that the touch pressure sensitivity system uses to determine pressure sensitivity behavior of a touch-based input.

According to one or more embodiments, the touch pressure sensitivity system utilizes the determined input element value corresponding to a position of the continuous-value input element to determine an exponential curve function. Specifically, the touch pressure sensitivity system first determines an exponent including a power coefficient that is based on the input element value. The touch pressure sensitivity system then uses the exponent to generate the exponential curve function that includes a curve shape based on the determined exponent. By determining the curve shape based on the exponential curve function, the touch pressure sensitivity system provides fine-tuning of the pressure sensitivity behavior according to a single input/value (i.e., the position of the continuous-value input element).

In one or more embodiments, the touch pressure sensitivity system utilizes a non-linear mapping of position ranges to input element values. For example, the touch pressure sensitivity system utilizes a first power coefficient function for a first position range of the continuous-value input element and a second power coefficient function for a second position range of the continuous-value input element. To illustrate, in one or more embodiments, when the first position range and the second position range correspond to a half of the full range of movement, the halfway position of the continuous-value input element does not correspond to halfway between a minimum and a maximum value of the power coefficient. Thus, the touch pressure sensitivity system weights the resulting pressure sensitivity behavior in favor of exponential curve functions for commonly used pressure sensitivity curves.

In one or more additional embodiments, the touch pressure sensitivity system utilizes the input element value to determine one or more additional variables associated with the pressure sensitivity curve. For example, the touch pressure sensitivity system determines a starting value and an ending value for the pressure sensitivity curve based on the input element value. The starting value and the ending value provide minimum and maximum values for the pressure sensitivity curve in accordance with the exponential curve function.

After generating the pressure sensitivity curve, the touch pressure sensitivity system utilizes the pressure sensitivity curve to determine a display output (e.g., brush size, opacity) of a graphical user interface tool (e.g., a user-controlled design editing tool). In particular, the touch pressure sensitivity system determines a pressure of an input (e.g., a touch-based input such as a stylus pen or finger). The touch pressure sensitivity system then determines the display output of the graphical user interface tool by determining an output value from the pressure sensitivity curve corresponding to the pressure of the input.

As noted briefly above, some conventional systems that utilize touch-based inputs lack flexibility. For example, some existing touch-based computing systems provide essentially no customizability of pressure sensitivity behaviors. Specifically, some conventional systems use a one-size-fits-all approach that applies the same pressure sensitivity behavior (e.g., a linear pressure sensitivity behavior) to all users and/or to all graphical user interface. Because each person has a different style or preference for using a stylus pen (or other touch-based input) or apply different amounts of pressure on average, these conventional systems do not provide expected output results for many users.

Some existing touch-based computing systems provide customizable curves for setting a pressure sensitivity behavior of a touch-based input. These existing systems typically provide an interactive cubic spline that allows manual input to insert and/or adjust node positions along the cubic spline, thereby modifying the shape of the cubic spline. Additionally, some conventional systems allow users to insert a plurality of nodes into a cubic spline for even greater customization of the cubic spline. Complete control of the cubic spine can require nine different inputs/variables. While such conventional systems provide customizability, manual modification of a cubic spline to achieve the desired pressure sensitivity behavior is not intuitive. The complex relationships between the variables often makes manipulating the curve to get a desired result often beyond the ability of any but the most expert users. Furthermore, often even expert users are required to iterate multiple times to arrive at a curve that provides a desired result.

The disclosed touch pressure sensitivity system provides a number of advantages over existing systems. For example, the touch pressure sensitivity system improves the flexibility of computing devices with touch-based input. To illustrate, while some existing systems utilize one-size-fits-all approaches to apply a single pressure sensitivity behavior to all users of a given application or device regardless of user preference or input style, the touch pressure sensitivity system generates a customizable pressure sensitivity curve based on an exponential curve function. Specifically, by utilizing an exponential curve function to generate a customizable pressure sensitivity curve, the touch pressure sensitivity system accurately models pressure sensitivity behaviors for a large number of use cases.

Additionally, the touch pressure sensitivity system improves efficiency of touch-based computing devices. In contrast to existing systems that experience a significant tradeoff between customizability and usability, the touch pressure sensitivity system provides simplified interface controls while maintaining significant customizability of pressure sensitivity behavior. For example, the touch pressure sensitivity system provides a continuous-value input element such as a slider element to customize the pressure sensitivity curve. Accordingly, the touch pressure sensitivity system maps a single value (e.g., an input element value based on a position of the continuous-value input element) to a plurality of values associated with the exponential curve function and pressure sensitivity curve.

As illustrated by the foregoing discussion, the present disclosure describes various features and advantages of the touch pressure sensitivity system. As used in this disclosure, for example, the term "pressure sensitivity curve" refers to a relationship between a pressure of a touch-based input and a display output of a graphical user interface tool. In one or more embodiments, a pressure sensitivity curve includes a plot of input values from a touch-based input to output values in connection with a graphical user interface tool such as a drawing output. In some embodiments, a pressure sensitivity curve includes at least a portion of an exponential curve function, a starting value, and an ending value.

Additionally, as used herein, the term "pressure sensitivity" refers to a measure of change in an output value based on a change in pressure of a touch-based input. For example, a pressure sensitivity determines how much a display output increases in response to an increase of pressure value of an input. In some embodiments, a pressure sensitivity is dependent on a corresponding pressure sensitivity curve.

As used herein, the term "exponential curve function" refers to a mathematical function that grows in proportion to its current value. Specifically, an exponential curve function includes values that change based on a value of an exponent. For example, an exponential curve function includes at least one constant that increases based on a value in the exponent. Accordingly, as used herein, the term "exponent" refers to a value that causes an exponential curve function to increase in proportion to the current value of the exponential curve function. For instance, an exponent value greater than one causes a value of an exponential curve function to increase more quickly over time, while an exponent value less than one causes a value of an exponential curve function to increase more slowly over time. Additionally, an exponent value equal to one causes a value of an exponential curve function to increase linearly.

As used herein, the term "power coefficient" refers to a value used to determine an exponent of an exponential curve function. For example, the touch pressure sensitivity system determines a power coefficient by utilizing a function based on an input element value of a continuous-value input element. In one or more embodiments, a power coefficient is based on a non-linear mapping function with the input element value. Specifically, a non-linear mapping function results in a first set of power coefficient values by utilizing a first power coefficient function based on a first position range of a continuous-value input element and a second set of power coefficient values by utilizing a second power coefficient function based on a second position range of a continuous-value input element.

As used herein, the term "starting value" refers to a minimum display value in a pressure sensitivity curve. For instance, a starting value includes the lowest possible display output associated with a graphical user interface tool. In one or more embodiments, a starting value indicates a minimum value along the y-axis in a pressure sensitivity curve. Additionally, as used herein, the term "ending value" refers to a pressure value at which a display output maximizes in a pressure sensitivity curve. For example, an ending value includes the highest possible display output based on an input pressure for a graphical user interface tool based on a corresponding pressure sensitivity curve. In one or more embodiments, an ending value indicates a value along the x-axis in a pressure sensitivity curve at which the pressure sensitivity curve reaches a maximum display output (e.g., a value along the y-axis of 1).

As used herein, the term "graphical user interface tool" refers to a command for creating or editing a digital design within a computing application. For example, a graphical user interface tool includes, but is not limited to, a drawing tool, a painting tool, a cloning tool, an eraser tool, or another tool that modifies digital design content based on a position of the graphical user interface tool relative to the digital design content.

Furthermore, as used herein, the term "touch-based input" refers to a method of interacting with a touchscreen or touch display device of a computing device. In some embodiments, a touch-based input includes a stylus pen or a finger that interacts with digital content via contact with a touchscreen display. In one or more additional embodiments, a touch-based input includes an input to an external device such as an external touchscreen display device, an external tablet computing device, a touchpad, or another external touch device in communication with a computing device. In various examples, a touch-based input includes resistive touch, capacitive touch, ultrasonic, or surface acoustic wave interactions with a display device.

As used herein, the term "continuous-value input element" refers to a graphical user interface element that corresponds to a possible infinite number of values based on a position of the graphical user interface element. In one or more embodiments, a continuous-value input element includes a slider element or a dial element that includes a continuous range of positions between two edge values. For example, changing the continuous-value input element from a first position to a second position changes an input element value associated with the continuous-value input element from a first value to a second value with any number of possible values in between the first value and the second value. According to various embodiments, different computing devices determine different granularities of possible input element values corresponding to possible positions of the continuous-value input element.

Turning now to the figures, FIG. 1 illustrates a schematic diagram of a system environment 100 in which a touch pressure sensitivity system 102 operates. In particular, the system environment 100 includes server device(s) 104 and a client device 106 in communication via a network 108. Moreover, as shown, the server device(s) 104 include a digital content editing system 110, which includes the touch pressure sensitivity system 102. Additionally, the client device 106 includes a client application 112 (e.g., a digital content editing application).

As shown in FIG. 1, the server device(s) 104 includes or host the digital content editing system 110. In one or more embodiments, the digital content editing system 110 includes, or is part of, one or more systems that implement the management of digital content items for storing, creating, modifying, or displaying digital content items for one or more users of the digital content editing system 110. For example, the digital content editing system 110 provides tools for viewing, generating, editing, or otherwise interacting with digital content items using one or more graphical user interface tools via the client application 112. In some embodiments, the digital content editing system 110 provides a graphical user interface (e.g., within a web browser) to the client device 106 for a user to interact with digital content items via the client application 112 on the client device 106.

In one or more embodiments, digital content items include digital designs. Accordingly, the digital content editing system 110 provides tools for generating, editing, or otherwise interacting with digital designs. For example, the digital content editing system 110 provides tools for generating and editing digital designs. To illustrate, the digital content editing system 110 provides digital design editing tools such as a digital pen, a digital paintbrush, a digital clone tool, a digital eraser, and/or other digital design editing tools to the client device 106 for use via the client application 112. In some embodiments, the digital content editing system 110 provides digital design editing tools to use via touch-based inputs at the client device 106.

In connection with providing tools for editing digital designs, the digital content editing system 110 includes the touch pressure sensitivity system 102 to customize the behavior of touch-based graphical user interface tools. In one or more embodiments, the touch pressure sensitivity system 102 provides a continuous-value input element within a graphical user interface associated with editing digital designs (e.g., within the client application 112) to customize a pressure sensitivity curve associated with touch-based tools. Specifically, the touch pressure sensitivity system 102 determines an exponential curve function based on a position of the continuous-value input element. The touch pressure sensitivity system 102 then generates a customized pressure sensitivity curve utilizing the exponential curve function. By customizing the pressure sensitivity curve for each user via the continuous-value input element, the touch pressure sensitivity system 102 provides an improved user experience via the client application 112.

In addition, as shown in FIG. 1, the system environment 100 includes the client device 106. In one or more embodiments, the client device 106 includes, but is not limited to, a mobile device (e.g., smartphone or tablet), a laptop, or a desktop, including those explained below with reference to FIG. 9. More specifically, the client device 106 includes a computing device with a touch-based input (e.g., via a display device). Furthermore, although not shown in FIG. 1, in one or more embodiments, the client device 106 is operated by a user (e.g., a user included in, or associated with, the system environment 100) to perform a variety of functions. In particular, the client device 106 performs functions, such as, but not limited to, accessing, viewing, and interacting with digital designs (e.g., via the client application 112). Additionally, in some embodiments, the client device 106 performs functions for generating and editing digital designs to provide to the digital content editing system 110 or another system via the network 108. In one or more embodiments, the touch pressure sensitivity system 102 receives pressure sensitivity customization data from the client device 106 to customize a pressure sensitivity curve for a user of the client device 106. Although FIG.

1 illustrates the system environment 100 with a single client device 106, in some embodiments, the system environment 100 includes a different number of client devices.

In one or more embodiments, the server device(s) 104 include a variety of computing devices, including those described below with reference to FIG. 9. For example, the server device(s) 104 includes one or more servers for storing and processing data associated with digital content items (e.g., digital designs) and pressure sensitivity curves associated with a plurality of users of the touch pressure sensitivity system 102. In some embodiments, the server device(s) 104 also include a plurality of computing devices in communication with each other, such as in a distributed storage environment. In some embodiments, the server device(s) 104 comprise a content server. In additional embodiments, the server device(s) 104 also comprises an application server, a communication server, a web-hosting server, a social networking server, a digital content campaign server, or a digital communication management server.

Additionally, as shown in FIG. 1, the system environment 100 includes the network 108. The network 108 enables communication between components of the system environment 100. In one or more embodiments, the network 108 may include the Internet or World Wide Web. Additionally, in some embodiments, the network 108 includes various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, in one or more embodiments, the server device(s) 104 and the client device 106 communicate via the network using a variety of communication platforms and technologies suitable for transporting data and/or communication signals, including any known communication technologies, devices, media, and protocols supportive of data communications, examples of which are described with reference to FIG. 9.

Although FIG. 1 illustrates the server device(s) 104 and the client device 106 communicating via the network 108, in one or more embodiments, the various components of the system environment 100 communicate and/or interact via other methods (e.g., the server device(s) 104 and the client device 106 communicate directly). Furthermore, although FIG. 1 illustrates the touch pressure sensitivity system 102 being implemented by a particular component and/or device within the system environment 100, in one or more embodiments, the touch pressure sensitivity system 102 is implemented, in whole or in part, by other computing devices and/or components in the system environment 100 (e.g., the client device 106). For example, rather than the digital content editing system 110 and touch pressure sensitivity system 102 being hosted on the server device(s) 104 and supporting the client application 112, the digital content editing system 110 and touch pressure sensitivity system 102 can be resident and run directly on the client device 106.

Figure 2A:
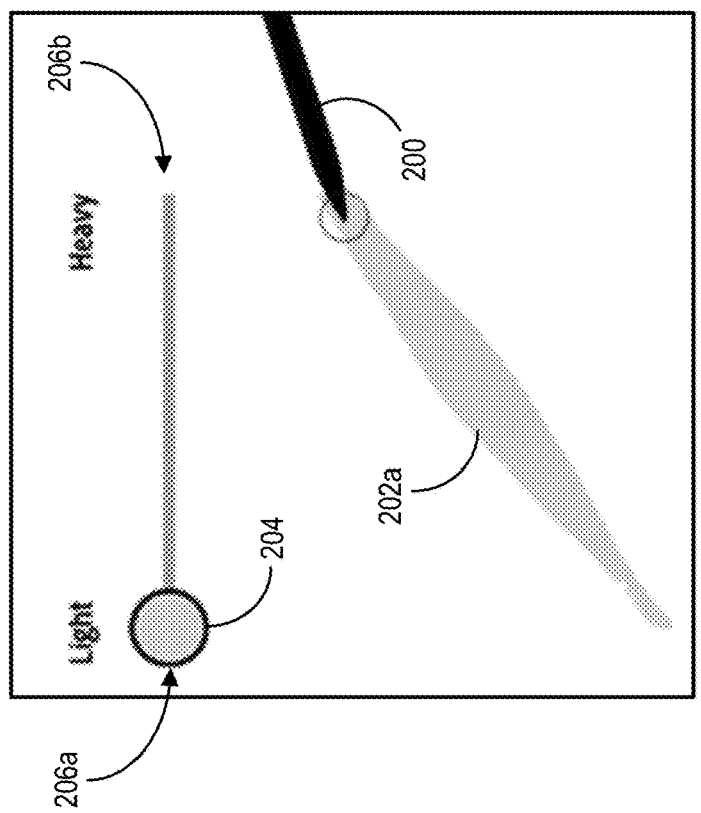

As mentioned above, the touch pressure sensitivity system 102 flexibly and efficiently customizes pressure sensitivity curves for graphical user interface tools. FIGS. 2A-2B illustrate display outputs of a graphical user interface tool based on input pressure. Specifically, FIG. 2A illustrates a first customization setting of a pressure sensitivity curve for the graphical user interface tool. FIG. 2B illustrates a second customization setting of a pressure sensitivity curve for the graphical user interface tool.

In one or more embodiments, as illustrated in FIG. 2A, the touch pressure sensitivity system 102 provides a graphical user interface tool to modify a digital design by interacting with a touch interface (e.g., a touchscreen display) via a touch-based input (e.g., a stylus pen 200). For example, the graphical user interface tool of FIG. 2A includes a drawing tool for creating or otherwise modifying a digital design based on a position of the touch-based input. In some embodiments, the graphical user interface tool includes a display output 202a that mimics the functionality of a real-world drawing tool (e.g., a pen, pencil, paintbrush, airbrush, or marker) by pressing the touch-based input to the touch interface. In additional embodiments, the graphical user interface tool includes an eraser tool, a cloning tool, or another tool that modifies a digital design by removing content or duplicating content according to a position of the touch-based input on the touch interface.

As further illustrated in FIG. 2A, the touch pressure sensitivity system 102 provides a continuous-value input element 204 for setting a pressure sensitivity behavior of the graphical user interface tool. In one or more embodiments, the continuous-value input element 204 includes a movable slider element along a path. Specifically, the path associated with the slider element includes a continuous set of possible positions for the slider element from a first position 206a at a left side of the path to a second position 206b at a right side of the path. FIG. 2A illustrates that the continuous-value input element 204 is positioned at the first position 206a.

In response to determining that the continuous-value input element 204 is at the first position 206a, the touch pressure sensitivity system 102 generates a pressure sensitivity curve for the graphical user interface tool. In one or more embodiments, the touch pressure sensitivity system 102 determines an input element value based on the continuous-value input element being at the first position 206a. As illustrated in FIG. 2A, the first position 206a corresponds to a "light" pressure sensitivity behavior, which results in a fastest increase (relative to other pressure sensitivity behaviors) from a minimum value of display output relative to input pressure.

As mentioned, in one or more embodiments, the continuous-value input element 204 corresponds to a path that includes a plurality of different positions along with the touch pressure sensitivity system 102 can move the continuous-value input element (e.g., via translation). FIG. 2B illustrates that the continuous-value input element 204 is at the second position 206b along the path. By modifying the position of the continuous-value input element 204 from the first position 206a to the second position 206b (e.g., in response to a user input), the touch pressure sensitivity system 102 also changes the pressure sensitivity behavior of the touch-based input. In the embodiment of FIG. 2B, for example, the second position 206b corresponds to a "heavy" pressure sensitivity behavior, which results in a slowest increase (relative to other pressure sensitivity behaviors) from a minimum value of display output relative to input pressure. As illustrated, the display output for the heavy pressure sensitivity behavior is different than the display output for the light pressure sensitivity behavior for the same input pressures.

Additionally, in one or more alternative embodiments, the continuous-value input element 204 includes a dial element that includes a plurality of different positions corresponding to a rotation of the dial element. For example, the dial element includes a first position corresponding to a left-most rotation of the dial element and a second position corresponding to a right-most rotation of the dial element. Similar to a slider element, the dial element includes a continuous set of positions between the first position and the second position. Thus, the position of a dial element includes a rotational position of the dial element.

Figure 3:
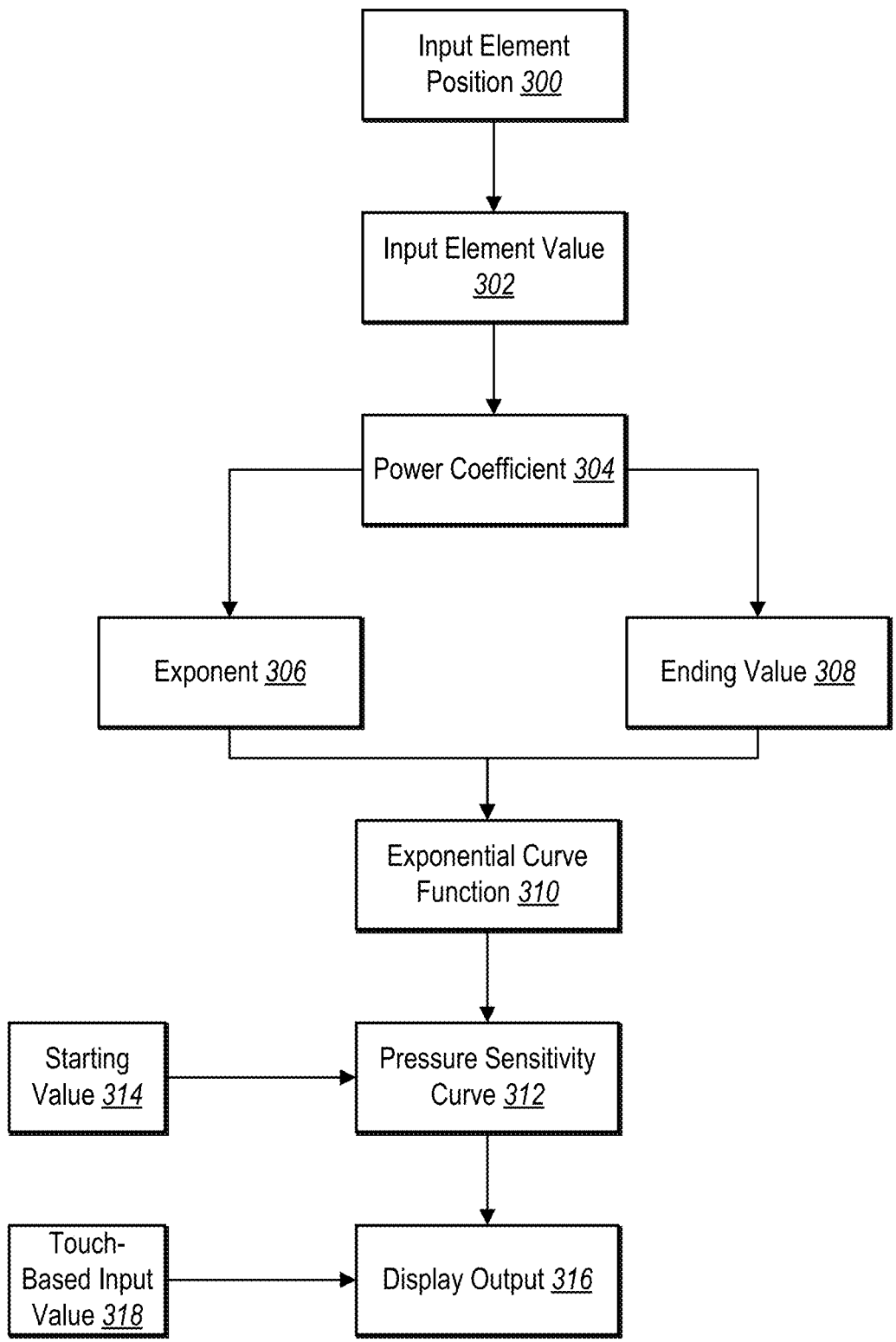
FIG. 3 illustrates a sequence-flow diagram of a process for generating a pressure sensitivity curve of a graphical user interface tool in accordance with one or more implementations.

FIG. 3 illustrates a sequence-flow diagram of a process for generating a pressure sensitivity curve based on a continuous-value input element. In particular, the touch pressure sensitivity system 102 utilizes the continuous-value input element to generate the pressure sensitivity curve and establish a pressure sensitivity behavior for a graphical user interface tool. As illustrated, the touch pressure sensitivity system 102 utilizes an exponential curve function based on the position of the continuous-value input element to generate the pressure sensitivity curve.

FIG. 3 illustrates that the touch pressure sensitivity system 102 first determines an input element position 300 corresponding to a continuous-value input element. As mentioned, the continuous-value input element includes a plurality of possible positions, for example, along a slider path or a rotational path. The touch pressure sensitivity system 102 provides the continuous-value input element within a graphical user interface, such as within a client application for digital design editing. To determine the input element position 300 of the continuous-value input element, in one or more embodiments, the touch pressure sensitivity system 102 utilizes information from a client application including the continuous-value input element on a client device (e.g., the client device 106 of FIG. 1).

FIG. 3 illustrates that the touch pressure sensitivity system 102 utilizes the input element position 300 to determine an input element value 302. More specifically, the touch pressure sensitivity system 102 converts the input element position 300 to a numerical value that represents the input element position 300. For example, the touch pressure sensitivity system 102 determines the input element value 302 by determining the input element position 300 relative to a range of motion of the continuous-value input element. To illustrate, if the input element position 300 is one-third of the way between the left-most position and the right-most position of a slider path, the touch pressure sensitivity system 102 determines the input element value 302 as one-third of a total possible value.

In one or more embodiments, the touch pressure sensitivity system 102 represents the input element value 302 according to a predetermined value scale. To illustrate, in one or more embodiments, the touch pressure sensitivity system 102 utilizes the predetermined value scale to determine specific values for the set of possible continuous values corresponding to the continuous motion range of the continuous-value input element. In one or more embodiments, the touch pressure sensitivity system 102 determines the input element position 300 by determining a relative position value for the input element position 300. In some embodiments, the touch pressure sensitivity system 102 also rounds the relative position value to a predetermined decimal place according to the predetermined value scale. In such embodiments, by rounding the relative position value, the touch pressure sensitivity system 102 discretizes the possible set of continuous values to different numbers of discrete input element values.

Once the touch pressure sensitivity system 102 has determined the input element value 302 corresponding to the input element position 300, the touch pressure sensitivity system 102 determines a power coefficient 304 based on the input element value 302. Specifically, the touch pressure sensitivity system 102 determines the power coefficient 304 utilizing at least one power coefficient function to map the determined input element value 302 to the power coefficient 304. In at least some embodiments, the touch pressure sensitivity system 102 determines the power coefficient 304 to use in generating one or more variables of an exponential curve function, which the touch pressure sensitivity system 102 further utilizes to generate a pressure sensitivity curve.

In one or more embodiments, the touch pressure sensitivity system 102 utilizes a non-linear mapping between input element values and power coefficients. For example, in at least some embodiments, the touch pressure sensitivity system 102 generates the power coefficient 304 by utilizing a first power coefficient function in response to determining that the input element value 302 falls within a first range of values. The touch pressure sensitivity system 102 further utilizes a second power coefficient function in response to determining that the input element value 302 falls within a second range of values. By utilizing a plurality of power coefficient functions to generate power coefficients based on corresponding input element values, the touch pressure sensitivity system 102 provides a non-linear mapping between positions of the continuous-value input element and power coefficients.

In one or more embodiments, the touch pressure sensitivity system 102 determines the power coefficient 304 as:

$$p = \left\{ 0 \leq s \leq 0.5 : \frac{(.86 - s)}{.36}, 0.5 < s \leq 1 : \frac{(1.93 - s)}{1.43} \right\}$$

where p represents the power coefficient 304 and s represents the input element value 302. According to one or more embodiments, the touch pressure sensitivity system 102 utilizes a first power coefficient function for a first set of input element values (e.g., $0 \leq s \leq 0.5$) and a second power coefficient function for a second set of input element values (e.g., $0.5 < s \leq 1$). This results in a non-linear function that maps the input element values to the power coefficient values using different slopes based on the position of the continuous-value input element (e.g., for a first half of the possible positions and a second half of the possible positions). In one or more additional embodiments, the touch pressure sensitivity system 102 utilizes more than two different power coefficient functions for determining the power coefficient 304, such as for a first set, a second set, and a final set of possible positions. Furthermore, while the algorithm above includes specific constants (e.g., based on empirically selected values), in one or more alternative embodiments, the touch pressure sensitivity system 102 utilizes different values for determining the power coefficient 304 such as different constants or non-linear variables.

After generating the power coefficient 304, FIG. 3 illustrates that the touch pressure sensitivity system 102 generates an exponent 306 and an ending value 308 based on the power coefficient 304. Specifically, as mentioned, the touch pressure sensitivity system 102 utilizes the power coefficient 304 to determine a plurality of variables of an exponential curve function. In one or more embodiments, the touch pressure sensitivity system 102 determines the exponent 306 representing the power to which a particular variable or constant increases over time by including the power coefficient 304 in the exponent 306. For example, the touch pressure sensitivity system 102 can include the power coefficient 304 in a denominator position within the exponent 306.

Additionally, FIG. 3 illustrates that the touch pressure sensitivity system 102 generates the ending value 308 based on the power coefficient 304. For example, the ending value 308 indicates a value for the exponential curve function at which an input pressure reaches a maximum display output. To illustrate, in some embodiments, the touch pressure sensitivity system 102 determines the ending value 308 by determining a value at which an exponential curve function reaches a maximum possible display output (e.g., a value of 1) based on the power coefficient 304. In one or more embodiments, the touch pressure sensitivity system 102 determines the ending value 308 as:

$m = 1-(p-0.65) \cdot 0.12$ in which m represents the ending value and p represents the power coefficient, as previously mentioned. The touch pressure sensitivity system 102 thus determines the ending value 308 by subtracting a value based on the power coefficient 304 from 1 according to a linear function. Although the algorithm above includes empirically determined constants, in one or more embodiments, the touch pressure sensitivity system 102 utilizes one or more different constants or variables to produce different ending values.

In response to, or otherwise in connection with, determining the exponent 306 and the ending value 308 based on the power coefficient 304, FIG. 3 illustrates that the touch pressure sensitivity system 102 determines an exponential curve function 310 using the exponent 306 and the ending value 308. For example, as mentioned, the touch pressure sensitivity system 102 uses the exponent 306 to determine a rate of increase for the exponential curve function 310, while the ending value 308 determines the input pressure value at which the exponential curve function 310 reaches a maximum display output. In one or more embodiments, the touch pressure sensitivity system 102 determines the exponential curve function 310 as:

$$y = \left(\frac{x}{m}\right)^{\frac{1}{p}}$$

in which x represents an input pressure value and y represents an output value (e.g., a display output). Furthermore, the exponential curve function 310 includes the power coefficient p in the exponent and the ending value m in a denominator of a value modified by the exponent.

According to one or more embodiments, the touch pressure sensitivity system 102 generates a pressure sensitivity curve 312 utilizing the exponential curve function 310. For example, the touch pressure sensitivity system 102 generates the pressure sensitivity curve 312 including the exponential curve function 310. FIG. 3 illustrates that the touch pressure sensitivity system 102 also determines a starting value 314 for the pressure sensitivity curve 312. In particular, the starting value 314 indicates a minimum output value of the pressure sensitivity curve 312. Accordingly, in one or more embodiments, the touch pressure sensitivity system 102 generates the pressure sensitivity curve 312 to output a value that is at least the starting value 314, regardless of the input element value 302.

In one or more embodiments, the touch pressure sensitivity system 102 generates the pressure sensitivity curve 312 as:

$$y = \max\left(0.03, \min\left(1, y = \left(\frac{x}{m}\right)^{\frac{1}{p}}\right)\right) \{0 \le x \le 1\}$$

where y represents the output of the pressure sensitivity curve. In the above algorithm, the starting value 314 is selected as 0.03, which causes the minimum value to be at least 0.03 while possibly increasing the minimum value depending on the exponential curve function 310. In alternative embodiments, the touch pressure sensitivity system 102 determines a different starting value 314 (e.g., 0). In additional embodiments, the starting value 314 varies depending on the input element value 302 and/or the power coefficient 304.

FIG. 3 illustrates that the touch pressure sensitivity system 102 determines a display output 316 based on the pressure sensitivity curve. For example, in one or more embodiments, the touch pressure sensitivity system 102 determines a touch-based input value 318 corresponding to a touch-based input. The touch pressure sensitivity system 102 determines the touch-based input value 318 indicating a pressure of the touch-based input. In at least some embodiments, the touch pressure sensitivity system 102 determines the touch-based input value 318 based on data received from a touch-based input device (e.g., from a stylus pen) or from a touch sensor (e.g., a sensor in a touchscreen display).

According to one or more embodiments, in response to a change in the touch-based input value, the touch pressure sensitivity system 102 changes the display output 316 based on the pressure sensitivity curve 312. For example, if the touch-based input value 318 results in an output value of the exponential curve function 310 that is higher than the starting value 314 and less than or equal to the maximum display output (e.g., 1), the display output 316 includes a value along the exponential curve function 310. Alternatively, if the touch-based input value 318 results in an output value higher than the maximum display output or lower than the starting value 314, the display output 316 includes a value at the maximum display output or the starting value 314, respectively. In other words, the touch pressure sensitivity system 102 can determine a size, opacity, or other characteristic of an output to be rendered in response to a touch-based input by utilizing the pressure sensitivity curve 312 to map a touch-based input value 318 to a display output 316.

As shown in FIG. 3, the pressure sensitivity curve 312 is based on the input element value 302. In one or more embodiments, the touch pressure sensitivity system 102 generates the pressure sensitivity curve 312 in real-time in response to a change in the input element value 302 (e.g., based on a modified input element position 300). For example, in some embodiments, the touch pressure sensitivity system 102 determines a new input element value in response to a change in position of the continuous-value input element. The touch pressure sensitivity system 102 then generates a new pressure sensitivity curve based on the new input element value. After determining the new pressure sensitivity curve, the touch pressure sensitivity system 102 determines the display output 316 based on touch-based input values by utilizing the new pressure sensitivity curve.

In one or more alternative embodiments, the touch pressure sensitivity system 102 generates one or more pressure sensitivity curves prior to determining the input element position 300. For example, in one or more embodiments, the touch pressure sensitivity system 102 generates a default pressure sensitivity curve based on a default input element position of a continuous-value input element. Additionally, in some embodiments, the touch pressure sensitivity system 102 generates a plurality of pressure sensitivity curves utilizing the exponential curve function based on commonly used pressure sensitivity settings. In such embodiments, the touch pressure sensitivity system 102 provides the predetermined settings from which a user can select, as well as providing the customizable pressure sensitivity settings based on the position of the continuous-value input element.

As described in relation to FIG. 3, the touch pressure sensitivity system 102 performs operations for setting pressure sensitivity behavior of a graphical user interface tool based on an exponential curve function. The operations allow the touch pressure sensitivity system 102 to more efficiently and flexibly generate pressure sensitivity curves for a graphical user interface tool based on a position of a continuous-value input element. Accordingly, the acts and operations illustrated and described above in relation to FIG. 3 can provide the corresponding acts (e.g., structure) for a step for generating a pressure sensitivity curve based on an input element value of the continuous-value input element.

As previously noted, the touch pressure sensitivity system 102 generates a pressure sensitivity curve based on an input element value. FIGS. 4A-4F illustrate a plurality of pressure sensitivity curves for different input element values. Accordingly, each pressure sensitivity curve in FIGS. 4A-4F results in a different pressure sensitivity behavior of a graphical user input tool. More specifically, the pressure sensitivity curves cause the touch pressure sensitivity system 102 to generate display outputs based on the pressure of one or more touch-based inputs, as well as the corresponding exponential curve functions, starting values, and ending values.

Figure 4C:
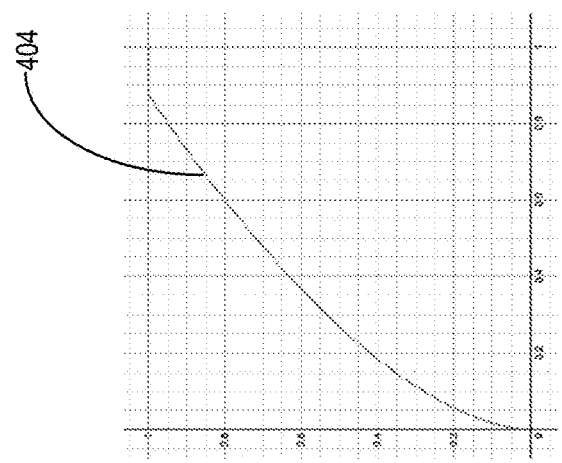
FIGS. 4A-4F illustrate graph diagrams of pressure sensitivity curves for a graphical user interface tool in accordance with one or more implementations.
Figure 4B:
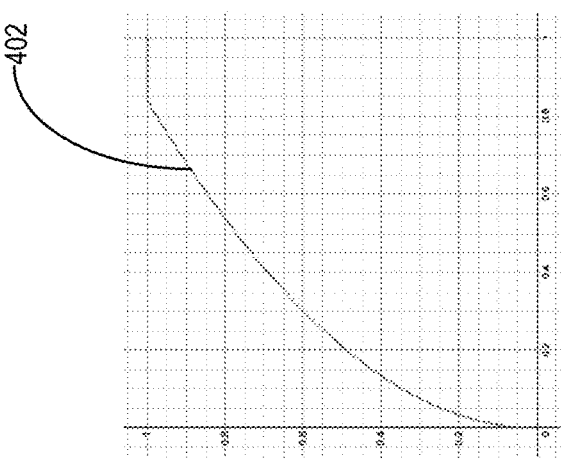
Figure 4A:
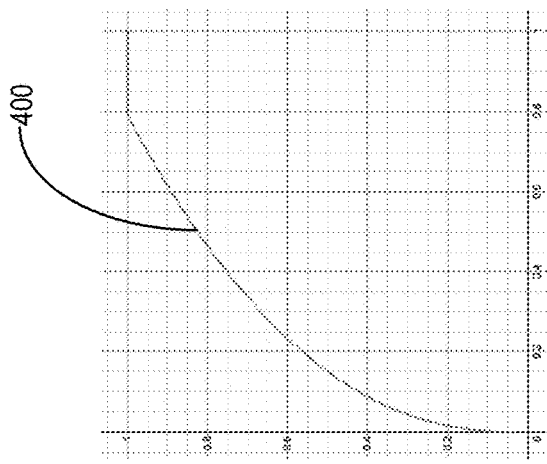

For example, in one or more embodiments, FIG. 4A illustrates a first pressure sensitivity curve 400 associated with a first exponential curve function. In particular, the touch pressure sensitivity system 102 determines the first exponential curve function based on a first position of a continuous-value input element by calculating an input element value (e.g., 0 in FIG. 4A) corresponding to the first position. The touch pressure sensitivity system 102 then utilizes the input element value to determine a power coefficient. In the embodiment of FIG. 4A, the power coefficient includes a determined value of 2.39 according to the power coefficient function above based on the input element value. Furthermore, based on the algorithms above for the power coefficient, ending value, and pressure sensitivity curve, the touch pressure sensitivity system 102 determines the pressure sensitivity curve to include an ending value of 0.79.

FIG. 4B illustrates a second pressure sensitivity curve 402 associated with a second exponential curve function. Specifically, the touch pressure sensitivity system 102 determines the second exponential curve function based on a second position of the continuous-value input element by calculating an input element value (0.14) corresponding to the second position. The touch pressure sensitivity system 102 determines the power coefficient as 2 based on the input element value. Additionally, the touch pressure sensitivity system 102 determines the pressure sensitivity curve to include an ending value of 0.84 (rounded up).

FIG. 4C illustrates a third pressure sensitivity curve 404 associated with a third exponential curve function. As illustrated, the touch pressure sensitivity system 102 determines the third exponential curve function based on a third position of the continuous-value input element by calculating an input element value (0.25) corresponding to the third position. The touch pressure sensitivity system 102 determines the power coefficient as 1.694 based on the input element value. Additionally, the touch pressure sensitivity system 102 determines the third pressure sensitivity curve 404 to include an ending value of 0.87.

Figure 4D:
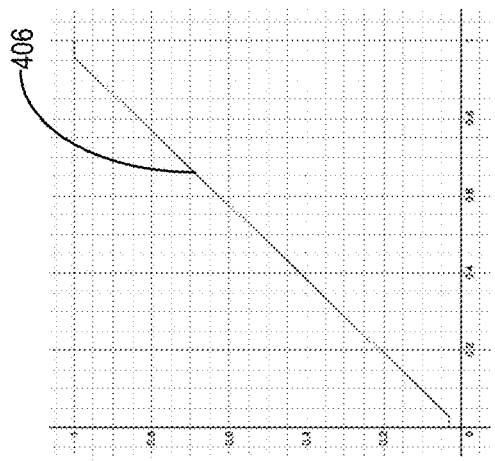

In particular, FIG. 4D illustrates a fourth pressure sensitivity curve 406 associated with a fourth exponential curve function. FIG. 4D illustrates that the touch pressure sensitivity system 102 determines the fourth exponential curve function based on a fourth position of the continuous-value input element by calculating an input element value (0.5) corresponding to the fourth position. The touch pressure sensitivity system 102 determines the power coefficient as 1 based on the input element value. Additionally, the touch pressure sensitivity system 102 determines the fourth pressure sensitivity curve 406 to include an ending value of 0.96. As shown, the exponential curve function becomes a linear function with the power coefficient having a value of 1. Additionally, as shown, the touch pressure sensitivity system 102 sets a starting value at 0.03, which results in a flattened portion of the fourth pressure sensitivity curve 406 at the lowest values of the input pressure.

Figure 4E:
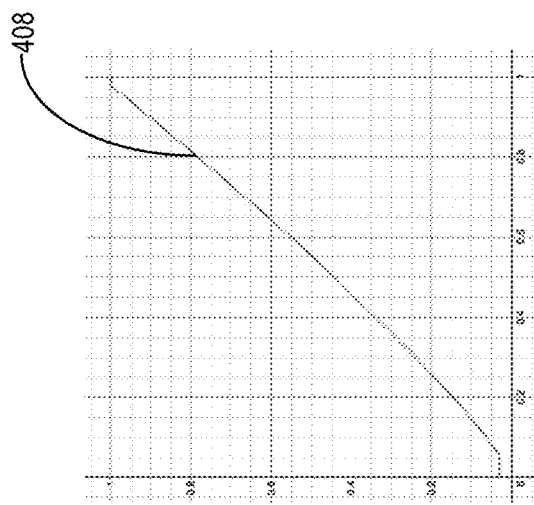

FIG. 4E illustrates a fifth pressure sensitivity curve 408 associated with a fifth exponential curve function. In particular, the touch pressure sensitivity system 102 determines the fifth exponential curve function based on a fifth position of the continuous-value input element by calculating an input element value (0.75) corresponding to the fifth position. The touch pressure sensitivity system 102 determines the power coefficient as 0.825 based on the input element value. Additionally, the touch pressure sensitivity system 102 determines the fifth pressure sensitivity curve 408 to include an ending value of 0.98. FIG. 4E also illustrates that the fifth pressure sensitivity curve 408 also curves a different direction than the pressure sensitivity curves of FIGS. 4A-4C due to the power coefficient having a value lower than 1.

Figure 4F:
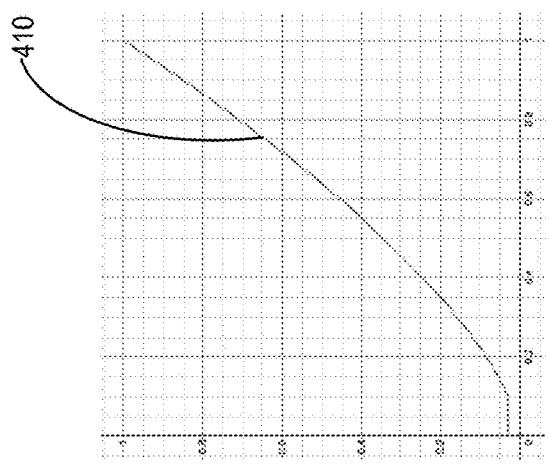

Additionally, FIG. 4F illustrates a sixth pressure sensitivity curve 410 associated with a sixth exponential curve function. In particular, the touch pressure sensitivity system 102 determines the sixth exponential curve function based on a sixth position of the continuous-value input element by calculating an input element value (1) corresponding to the sixth position. The touch pressure sensitivity system 102 determines the power coefficient as 0.65 based on the input element value. The touch pressure sensitivity system 102 also determines the sixth pressure sensitivity curve 410 to include an ending value of 1.

As previously mentioned, in one or more embodiments, the touch pressure sensitivity system 102 utilizes a non-linear function to determine the power coefficient based on the input element value. FIGS. 4A-4C illustrate a plurality of pressure sensitivity curves corresponding to power coefficients that the touch pressure sensitivity system 102 determines by utilizing a first power coefficient function. FIGS. 4D-4F illustrate a plurality of pressure sensitivity curves corresponding to power coefficients that the touch pressure sensitivity system 102 determines by utilizing a second power coefficient function.

Additionally, as shown in FIGS. 4A-4F, the touch pressure sensitivity system 102 generates pressure sensitivity curves that tend to shift more to the left side of the pressure sensitivity curve (e.g., by utilizing the exponential curve functions) based on common usage of touch-based inputs across a plurality of users. Specifically, in some embodiments, users generally utilize between 0 and 60-70% of a pressure of a touch-based input. Thus, the shape of most of the pressure sensitivity curves are weighted toward the left side of possible display output values to favor lighter input pressures.

Although FIGS. 4A-4F illustrate a plurality of pressure sensitivity curves corresponding to six different positions of a continuous-value input element, in one or more embodiments, the touch pressure sensitivity system 102 determines any number of different pressure sensitivity curves based on any number of different positions of the continuous-value input element. Accordingly, the touch pressure sensitivity system 102 provides significant customizability of the pressure sensitivity behavior of a graphical user interface tool according to user preferences by using the continuous-value input element to determine the pressure sensitivity curves.

Figure 5A:
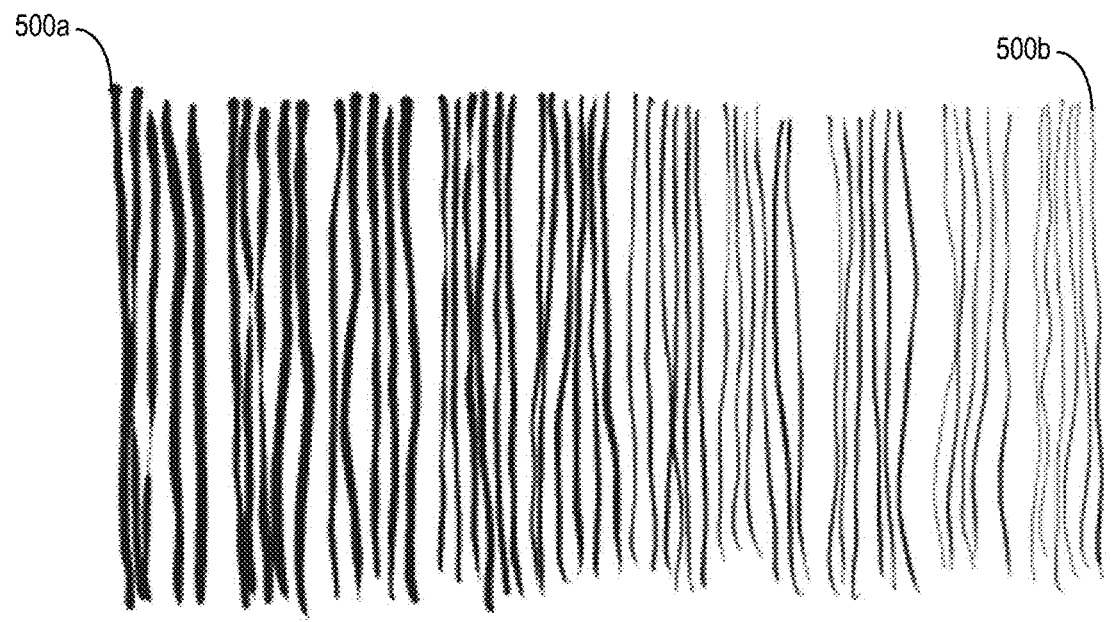
FIGS. 5A-5C illustrate diagrams of display outputs of graphical user interface tools in accordance with one or more implementations.
Figure 5B:
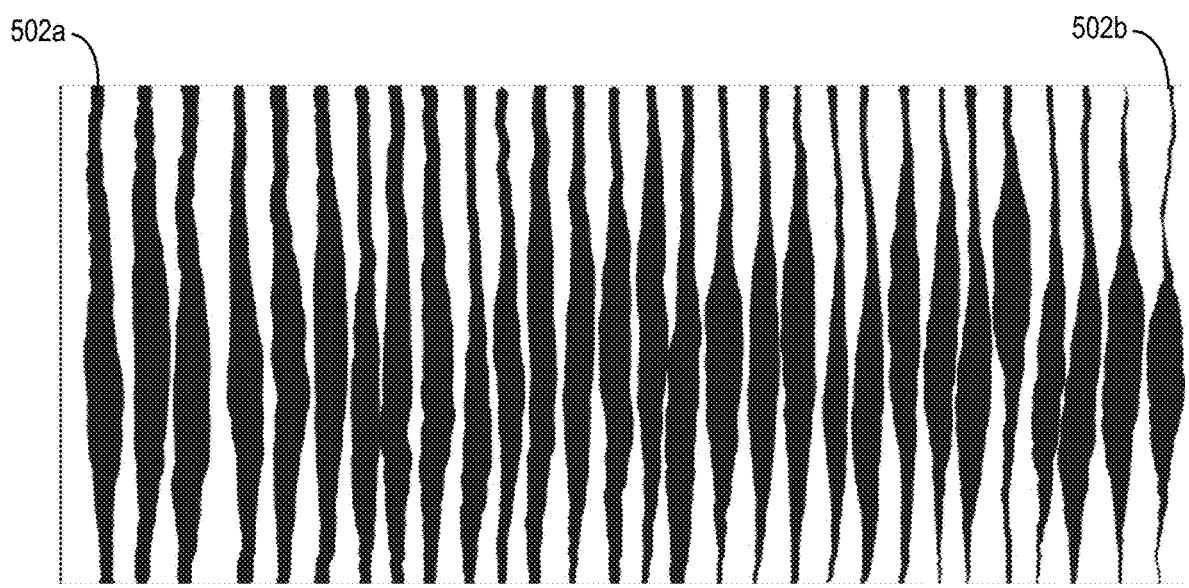
Figure 5C:
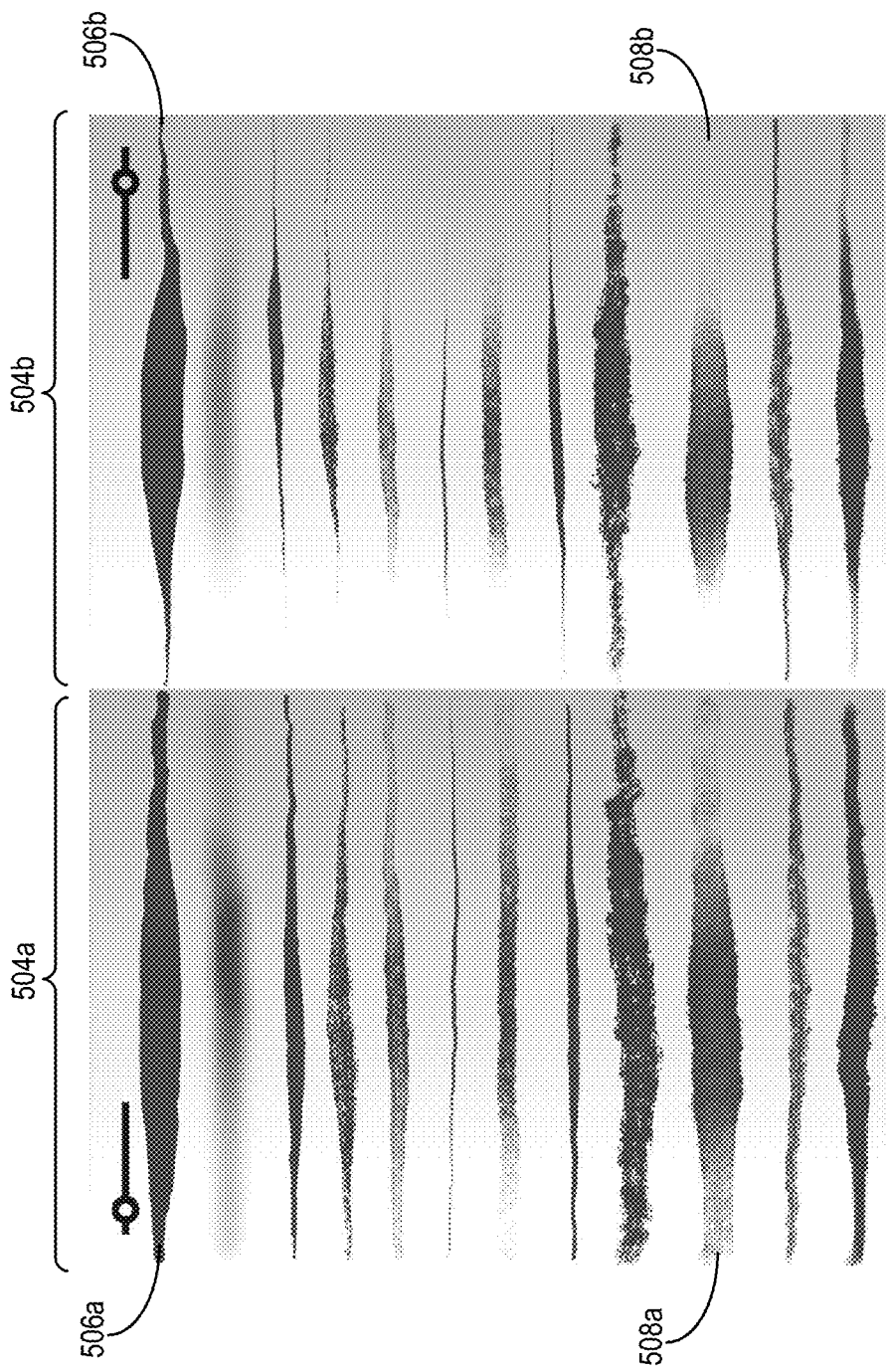

As previously mentioned, the touch pressure sensitivity system 102 generates different pressure sensitivity curves based on different continuous-value input elements. Each unique pressure sensitivity curve results in a different pressure sensitivity behavior for a graphical user interface tool. FIGS. 5A-5C illustrate display outputs for a plurality of graphical user interface tools based on different pressure sensitivity curves.

Specifically, FIG. 5A illustrates a comparison of minimum (or approximately minimum) display outputs of a graphical user interface tool corresponding to a plurality of different pressure sensitivity curves. For example, as illustrated, as the continuous-value input element moves from lighter pressure sensitivity behavior to heavier pressure sensitivity behavior. A first display output 500a having a thicker minimum display output corresponds to a lighter pressure sensitivity behavior (e.g., a lower input element value), which causes the pressure sensitivity curve to start at a higher value and increase more rapidly for lower pressure values. A second display output 500b having a thinner minimum display output corresponds to a heavier pressure sensitivity behavior (e.g., a higher input element value), which causes the pressure sensitivity curve to start at a minimum display output (e.g., a predetermined starting value) and increase more slowly for lower pressure values. Furthermore, a plurality of display outputs between the first display output 500a and the second display output 500b become increasingly thinner from left to right (e.g., from the first display output 500a to the second display output 500b).

FIG. 5B illustrates a plurality of varied display outputs corresponding to a plurality of different pressure sensitivity curves for a graphical user interface tool. As shown, a first display output 502a corresponds to a lighter pressure sensitivity behavior from a lower input element value. The first display output 502a has a thicker minimum display output and increases more rapidly at lower pressure values. A second display output 502b corresponds to a heavier pressure sensitivity behavior from a higher input element value. The second display output 502b has a thinner minimum display output and increases more slowly at lower pressure values. In contrast to the first display output 502a, however, the thickness of the display output of the second display output 502b increases more rapidly at higher pressure values. The display outputs between the first display output 502a and the second display output 502b gradually change with gradual changes in input element values from the lowest input element value to the highest input element value.

FIG. 5C illustrates a plurality of display outputs for a plurality of different graphical user interface tools for two different pressure sensitivity curves. Specifically, a first set of display outputs 504a corresponds to a first input element value corresponding to an input element position in a bottom half of a position range of a continuous-value input element. A second set of display outputs 504b corresponds to a second input element value corresponding to an input element position in an upper half of a position range of the continuous-value input element.

As noted above, changing the pressure sensitivity curve for a specific graphical user interface tool modifies a behavior of the display output of the graphical user interface tool. Additionally, in one or more embodiments, the touch pressure sensitivity system 102 also provides different changes in display outputs across different graphical user interface tools. For example, FIG. 5C illustrates that modifying a pressure sensitivity curve for a first graphical user interface tool modifies a thickness behavior from a first display output 506a to a second display output 506b of the first graphical user interface tool.

Additionally, FIG. 5C illustrates that modifying a pressure sensitivity curve for a second graphical user interface tool modifies an opacity behavior from a first display output 508a to a second display output 508b of the second graphical user interface tool. In one or more additional embodiments, the touch pressure sensitivity system 102 modifies the pressure sensitivity behavior of a variety of different graphical user interface tools in a number of ways by changing physical characteristics of the display outputs including, but not limited to, a size, an opacity, a density, a pattern, a color, or a shape of a display output for the graphical user interface tools. In further embodiments, the touch pressure sensitivity system 102 utilizes pressure sensitivity curves to modify a plurality of visual characteristics of a display output of a graphical user interface tool in response to different pressure input values.

Figure 6:
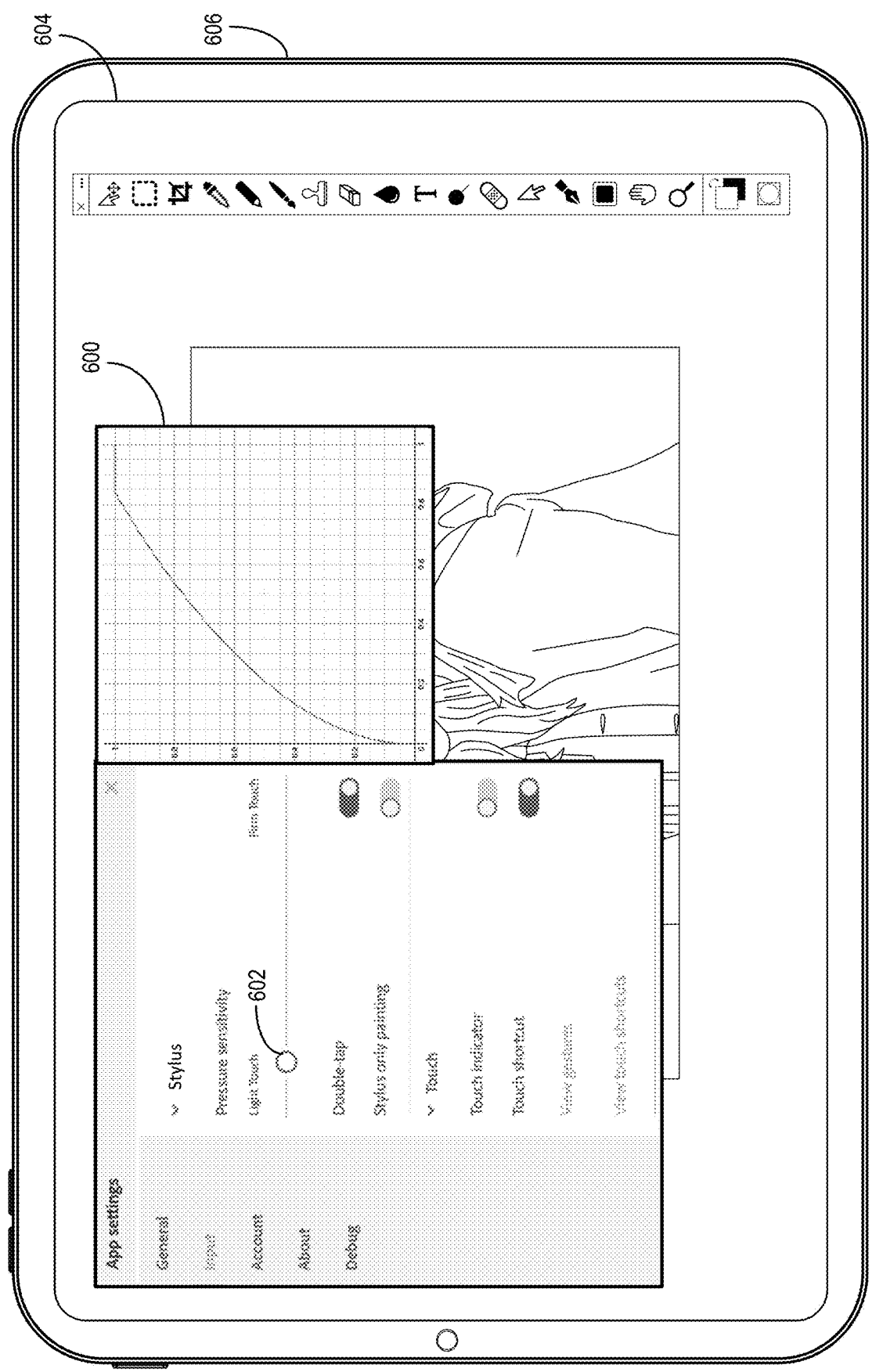
FIG. 6 illustrates a graphical user interface for modifying a pressure sensitivity curve in accordance with one or more implementations.

In one or more embodiments, the touch pressure sensitivity system 102 also provides additional information to a user in connection with modifying a position of a continuous-value input element. For example, FIG. 6 illustrates that the touch pressure sensitivity system 102 provides a graphical display including a representation 600 of a pressure sensitivity curve based on a position of a continuous-value input element 602. Specifically, in response to detecting a user interaction with the continuous-value input element 602 within a graphical user interface 604 on a client device 606, the touch pressure sensitivity system 102 generates the pressure sensitivity curve. For example, the touch pressure sensitivity system 102 determines an input element value corresponding to the position of the continuous-value input element 602. The touch pressure sensitivity system 102 then determines the exponential curve function and generates the pressure sensitivity curve based on the input element value.

In response to generating the pressure sensitivity curve, FIG. 6 illustrates that the touch pressure sensitivity system 102 also provides, for display within the graphical user interface 604, the representation 600 of the pressure sensitivity curve. To illustrate, in one or more embodiments, the touch pressure sensitivity system 102 provides the representation 600 as an overlay or within a predetermined portion of the graphical user interface 604 (e.g., next to the continuous-value input element 602). Providing the representation 600 of the pressure sensitivity curve provides a more detailed view of the pressure sensitivity behavior, which may be useful for more experienced users. In additional embodiments, the touch pressure sensitivity system 102 also continuously updates the representation 600 in response to the position of the continuous-value input element 602 changing. In one or more embodiments, the touch pressure sensitivity system 102 determines whether to display the representation 600 based on a user profile or user preference setting.

In one or more additional embodiments, the touch pressure sensitivity system 102 also provides an interactive representation of a pressure sensitivity curve for a graphical user interface tool. For instance, the touch pressure sensitivity system 102 provides an interactive pressure sensitivity curve by providing an option to manually set a power coefficient for generating a new pressure sensitivity curve. Additionally, in response to detecting a manually set power coefficient, the touch pressure sensitivity system 102 updates the position of the continuous-value input element 602 according to the power coefficient. In some embodiments, the touch pressure sensitivity system 102 also provides manual modification of a minimum or maximum display output of the pressure sensitivity curve.

In one or more embodiments, the touch pressure sensitivity system 102 also provides an option to set pressure sensitivity curves for individual graphical user interface tools. For example, the touch pressure sensitivity system 102 generates a first pressure sensitivity curve for a first graphical user interface tool and a second pressure sensitivity curve for a second graphical user interface tool. In alternative embodiments, the touch pressure sensitivity system 102 generates a single pressure sensitivity curve for all graphical user interface tools.

Furthermore, in some embodiments, the touch pressure sensitivity system 102 provides an option to store one or more pressure sensitivity curves for one or more graphical user interface tools in a user profile or in user preferences. Thus, the touch pressure sensitivity system 102 retrieves one or more pressure sensitivity curves from the user profile/preferences upon opening a client application each time. In additional embodiments, the touch pressure sensitivity system 102 shares profile settings across client applications. To illustrate, in response to a user storing pressure sensitivity curves in a user profile for a first client application, the touch pressure sensitivity system 102 utilizes the stored pressure sensitivity curves for a second client application based on the user profile.

Figure 7:
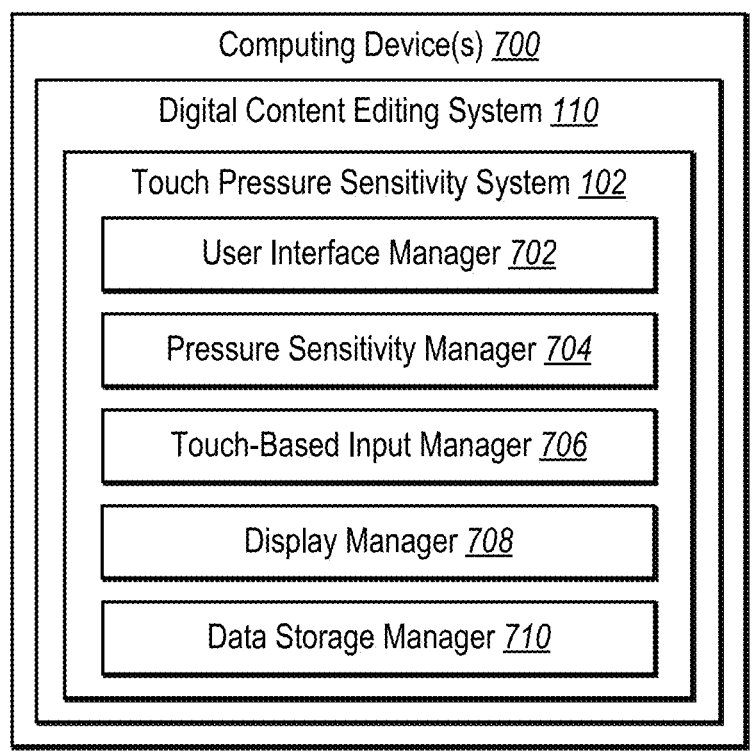
FIG. 7 illustrates a diagram of the touch pressure sensitivity system of FIG. 1 in accordance with one or more implementations.

FIG. 7 illustrates a detailed schematic diagram of an embodiment of the touch pressure sensitivity system 102 described above. As shown, the touch pressure sensitivity system 102 is implemented in the digital content editing system 110 on computing device(s) 700 (e.g., a client device and/or server device as described in FIG. 1, and as further described below in relation to FIG. 9). Additionally, in one or more embodiments, the touch pressure sensitivity system 102 includes, but is not limited to, a user interface manager 702, a pressure sensitivity manager 704, a touch-based input manager 706, a display manager 708, and a data storage manager 710. The touch pressure sensitivity system 102 can be implemented on any number of computing devices. For example, in some embodiments, the touch pressure sensitivity system 102 is implemented in a distributed system of server devices for managing digital content. In additional embodiments, the touch pressure sensitivity system 102 is implemented within one or more additional systems. In alternative embodiments, the touch pressure sensitivity system 102 is implemented on a single computing device such as a single client device.

In one or more embodiments, each of the components of the touch pressure sensitivity system 102 is in communication with other components using any suitable communication technologies. Additionally, in some embodiments, the components of the touch pressure sensitivity system 102 are in communication with one or more other devices including other computing devices of a user, server devices (e.g., cloud storage devices), licensing servers, or other devices/systems. It will be recognized that although the components of the touch pressure sensitivity system 102 are shown to be separate in FIG. 7, in one or more embodiments, one or more of the subcomponents are combined into fewer components, such as into a single component, or divided into more components as may serve a particular implementation. Furthermore, although the components of FIG. 7 are described in connection with the touch pressure sensitivity system 102, in alternative embodiments, at least some of the components for performing operations in conjunction with the touch pressure sensitivity system 102 described herein are implemented on other devices within the environment.

The components of the touch pressure sensitivity system 102 can include software, hardware, or both. For example, in one or more embodiments, the components of the touch pressure sensitivity system 102 include one or more instructions stored on a computer-readable storage medium and executable by processors of one or more computing devices (e.g., the computing device(s) 500). When executed by the one or more processors, the computer-executable instructions of the touch pressure sensitivity system 102 cause the computing device(s) 700 to perform the operations described herein. Alternatively, the components of the touch pressure sensitivity system 102 include hardware, such as a special purpose processing device to perform a certain function or group of functions. Additionally, or alternatively, the components of the touch pressure sensitivity system 102 include a combination of computer-executable instructions and hardware.

Furthermore, the components of the touch pressure sensitivity system 102 performing the functions described herein with respect to the touch pressure sensitivity system 102 may, for example, be implemented as part of a stand-alone application, as a module of an application, as a plug-in for applications, as a library function or functions that may be called by other applications, and/or as a cloud-computing model. Thus, the components of the touch pressure sensitivity system 102 may be implemented as part of a stand-alone application on a personal computing device or a mobile device. In some embodiments, the components of the touch pressure sensitivity system 102 are implemented in an application that provides digital design editing, including, but not limited to CREATIVE CLOUD®, ADOBE® FRESCO®, or PHOTOSHOP® software. "ADOBE," "ADOBE FRESCO" "CREATIVE CLOUD," and "PHOTOSHOP" are either registered trademarks or trademarks of Adobe Inc. in the United States and/or other countries.

FIG. 7 illustrates that the touch pressure sensitivity system 102 includes a user interface manager 702. The user interface manager 702 manages one or more graphical user interfaces of one or more client applications. Additionally, the user interface manager 702 provides one or more graphical user interface tools for generating, editing, or otherwise interacting with digital designs in one or more graphical user interfaces. The user interface manager 702 also provides continuous-value input elements for setting pressure sensitivity behaviors of graphical user interface tools.

In one or more embodiments, the touch pressure sensitivity system 102 includes a pressure sensitivity manager 704 for managing a pressure sensitivity behavior of graphical user interface tools. For example, in response to a user input to set a position of a continuous-value input element, the pressure sensitivity manager 704 determines an input element value based on the position of the continuous-value input element. The pressure sensitivity manager 704 utilizes the input element value to determine an exponential curve function and generate a corresponding pressure sensitivity curve.

FIG. 7 further illustrates that the touch pressure sensitivity system 102 includes a touch-based input manager 706 to manage user inputs to one or more graphical user interfaces via touch-based inputs. For example, the touch-based input manager 706 detects that a touch-based input (e.g., a stylus pen or a finger) interacts with a graphical user interface. The touch-based input manager 706 also detects a pressure of the touch-based input based on data from a pressure sensor in a display device or the touch-based input.

Additionally, FIG. 7 illustrates that the touch pressure sensitivity system 102 includes a display manager 708 for managing display outputs of graphical user interface tools. Specifically, the display manager 708 determines display outputs based on pressure values of touch-based inputs and pressure sensitivity curves for the graphical user interface tools. Additionally, the display manager 708 manages rendering of the display outputs on display devices for the graphical user interface tools.

The touch pressure sensitivity system 102 also includes a data storage manager 710 (that comprises a non-transitory computer memory/one or more memory devices) that stores and maintains data associated with digital designs and touch-based inputs. For example, the data storage manager 710 stores information associated with pressure sensitivity settings. To illustrate, the data storage manager 710 stores input element values for continuous-value input elements and pressure sensitivity curves based on the input element values. The data storage manager 710 also stores digital design content associated with touch-based inputs based on the pressure sensitivity curves.

Figure 8:
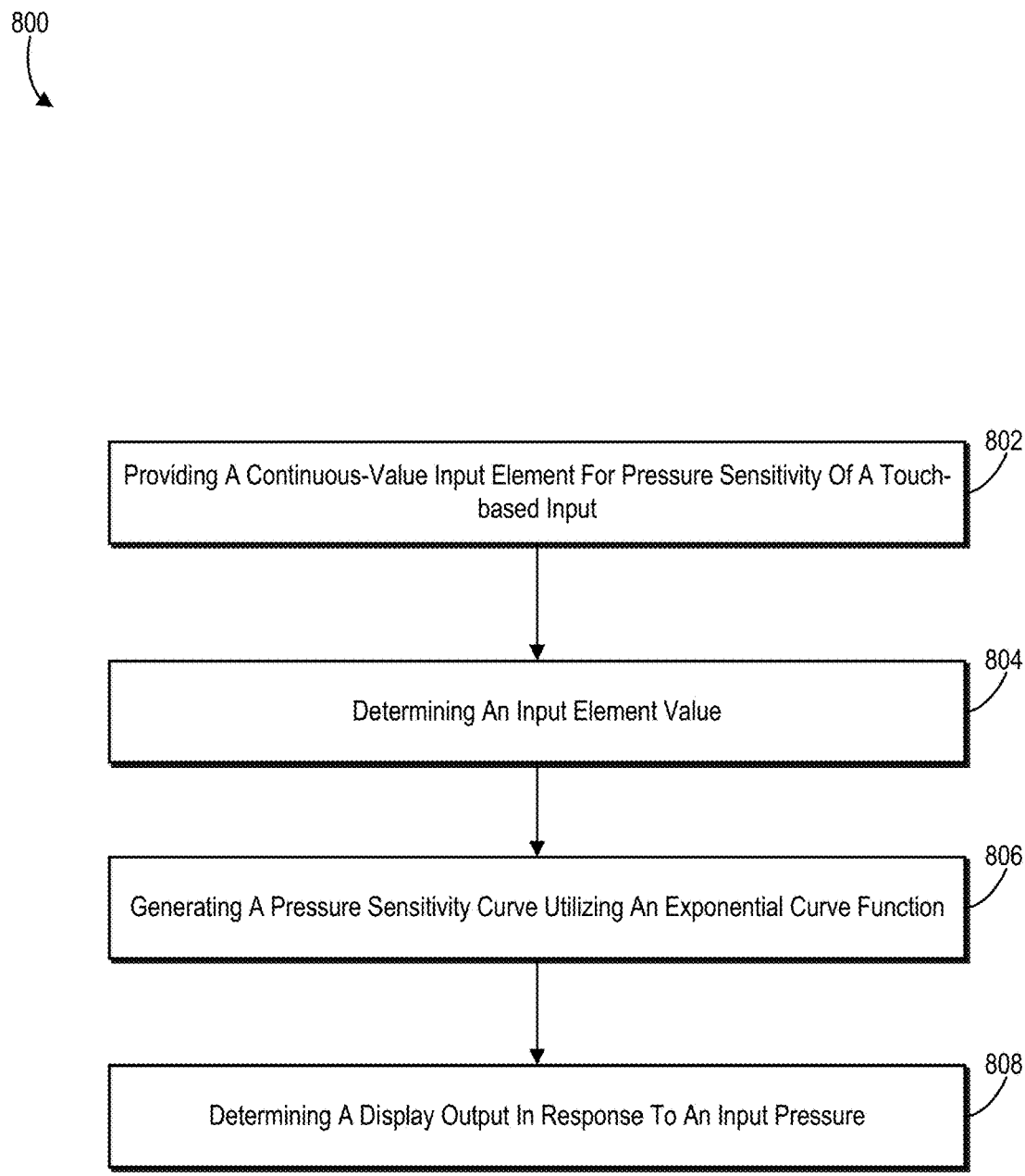
FIG. 8 illustrates a flowchart of a series of acts for generating a pressure sensitivity curve utilizing an exponential curve function in accordance with one or more implementations.

Turning now to FIG. 8, this figure shows a flowchart of a series of acts 800 of generating a pressure sensitivity curve utilizing an exponential curve function. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

As shown, the series of acts 800 includes an act 802 of providing a continuous-value input element for pressure sensitivity of a touch-based input. For example, act 802 involves providing, for display within a graphical user interface, a continuous-value input element in connection with a pressure sensitivity of a touch-based input. In one or more embodiments, the continuous-value input element comprises a slider input element or a dial input element. For instance, the continuous-value input element includes a continuous range of motion from a first position to a second position.

The series of acts 800 also includes an act 804 of determining an input element value. For example, act 804 involves determining an input element value corresponding to a position of the continuous-value input element. According to one or more embodiments, act 804 involves determining a relative position of the continuous-value input element along a continuous range of motion from a first position to a second position, and determining the input element value based on the relative position. In one or more embodiments, act 804 also involves determining the input element value on a predetermined value scale.

Additionally, the series of acts 800 includes an act 806 of generating a pressure sensitivity curve utilizing an exponential curve function. For example, act 806 involves generating a pressure sensitivity curve utilizing an exponential curve function by determining an exponent based on the input element value. In one or more embodiments, act 806 involves determining a power coefficient based on the input element value. Act 806 then involves determining, in response to determining the power coefficient, the exponent of the exponential curve function, wherein the exponent comprises the power coefficient.

In one or more embodiments, act 806 involves determining the power coefficient based on a non-linear mapping between the power coefficient and a plurality of input element values corresponding to a plurality of positions of the continuous-value input element. To illustrate, act 806 involves selecting, based on the input element value, the power coefficient from the non-linear mapping between the power coefficient and a plurality of input element values. Act 806 then involves determining the exponential curve function based on the selected power coefficient. In additional embodiments, act 806 involves determining a first range of values for the power coefficient based on a first position range of the continuous-value input element by utilizing a first power coefficient function, and determining a second range of values for the power coefficient based on a second position range of the continuous-value input element by utilizing a second power coefficient function, wherein the first power coefficient function is different than the second power coefficient function.

In one or more embodiments, act 806 involves determining an ending value for the exponential curve function based on the input element value, wherein the ending value indicates an input pressure value at which the display output of the graphical user interface tool reaches a maximum value. According to one or more embodiments, act 806 also involves setting a starting value corresponding to the display output of the graphical user interface, wherein the starting value indicates a minimum value for the display output. Act 806 then involves determining a transition point between the starting value and the exponential curve function based on the input element value. More specifically, act 806 involves generating, based on the input element value, the pressure sensitivity curve to include a transition point from the starting value to the exponential curve function according to a value at which the exponential curve function crosses the starting value along a vertical axis within a two-dimensional plot of the pressure sensitivity curve.

In one or more embodiments, act 806 then involves generating the pressure sensitivity curve with the starting value, the ending value, and a curve shape in a two-dimensional space in response to determining the input element value. For example, act 806 involves generating the pressure sensitivity curve comprising the starting value, the ending value, and a curve shape corresponding to the exponential curve function in real-time in response to determining the input element value.

The series of acts 800 further includes an act 808 of determining a display output in response to an input pressure. For example, act 808 involves determining, according to the pressure sensitivity curve, a display output of a graphical user interface tool in response to a pressure of an input. In one or more embodiments, act 808 involves determining, in response to the pressure of the input, the display output by determining a value of the pressure sensitivity curve along the vertical axis in connection with the starting value, the ending value, and the curve shape corresponding to the exponential curve function.

In one or more embodiments, the series of acts 800 includes determining, in response to an input to move the continuous-value input element to a new position, a new input element value corresponding to the new position of the continuous-value input element. The series of acts 800 then includes a new exponent based on the new input element value, and generating a new pressure sensitivity curve utilizing the exponential curve function based on the new exponent. For example, the series of acts 800 includes determining a new power coefficient based on the new input element value and then determining the new exponent based on the new power coefficient.

According to one or more embodiments, the series of acts 800 includes providing, for display within the graphical user interface, a plot comprising the pressure sensitivity curve with an editable power coefficient. For example, the series of acts 800 also includes receiving an input to modify the editable power coefficient via the graphical user interface. The series of acts 800 then includes updating the position of the continuous-value input element and the plot comprising the pressure sensitivity curve in response to the input to modify the editable power coefficient.

In one or more embodiments, the series of acts 800 also includes detecting movement of the continuous-value input element in connection with an input to the graphical user interface. The series of acts 800 also provide, for display within the graphical user interface, a continuously updating representation of the pressure sensitivity curve according to the movement of the continuous-value input element.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
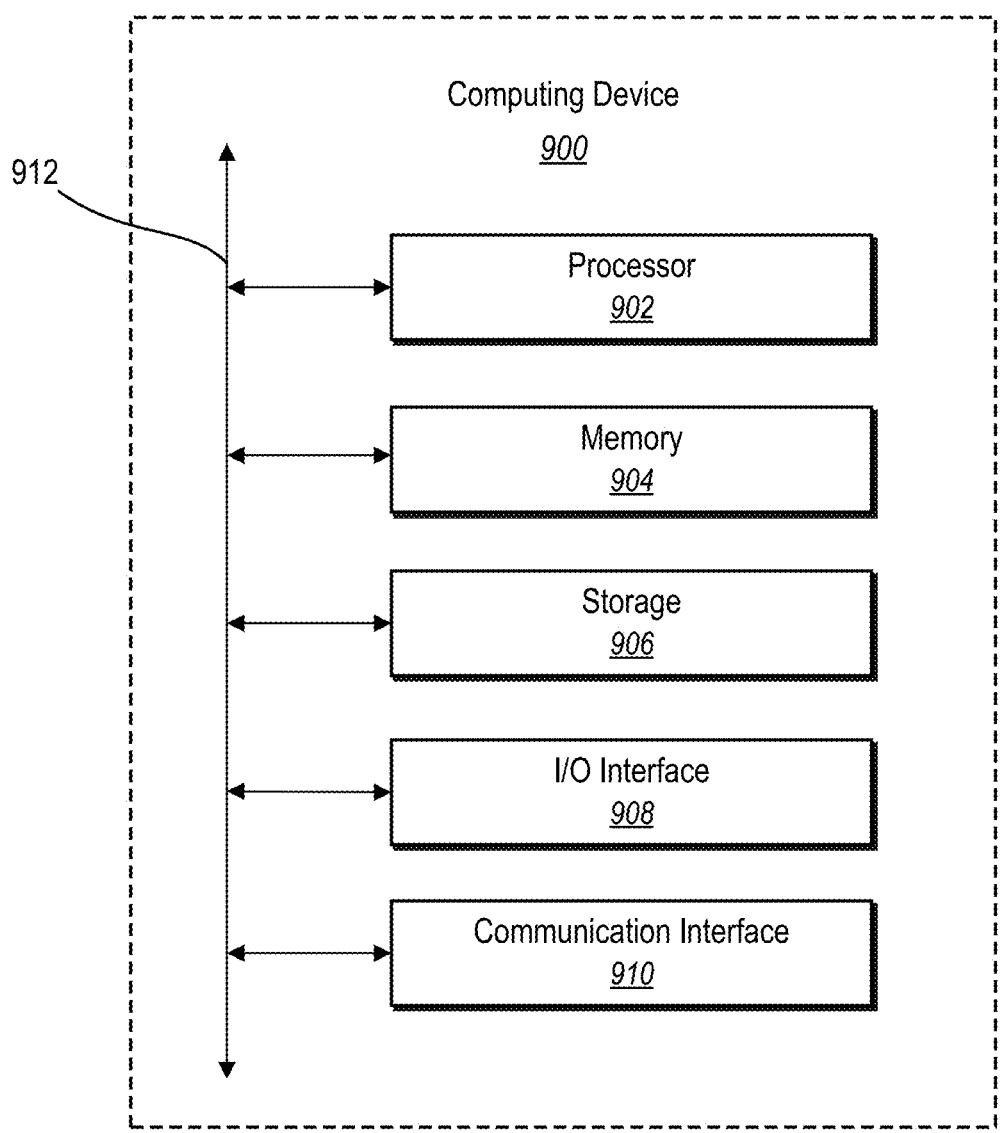
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the system(s) of FIG. 1. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for dynamically modifying workflows, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions for performing the methods described herein.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example, and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   provide, for display within a graphical user interface, a continuous-value input element in connection with a pressure sensitivity of a touch-based input;
   determine an input element value corresponding to a position of the continuous-value input element;
   generate a pressure sensitivity curve utilizing an exponential curve function by determining an exponent based on the input element value; and
   determine, according to the pressure sensitivity curve, a display output of a graphical user interface tool in response to a pressure of an input.

2. The non-transitory computer readable storage medium as recited in claim 1, further comprising instructions that, when executed by the at least one processor, cause the computing device to determine the exponential curve function by:
   determining a power coefficient based on the input element value; and determining, in response to determining the power coefficient, the exponent of the exponential curve function, wherein the exponent comprises the power coefficient.

3. The non-transitory computer readable storage medium as recited in claim 2, further comprising instructions that, when executed by the at least one processor, cause the computing device to determine the power coefficient based on a non-linear mapping between the power coefficient and a plurality of input element values corresponding to a plurality of positions of the continuous-value input element.

4. The non-transitory computer readable storage medium as recited in claim 3, further comprising instructions that, when executed by the at least one processor, cause the computing device to determine the power coefficient by:
   determining a first range of values for the power coefficient based on a first position range of the continuous-value input element; and
   determining a second range of values for the power coefficient based on a second position range of the continuous-value input element.

5. The non-transitory computer readable storage medium as recited in claim 1, further comprising instructions that, when executed by the at least one processor, cause the computing device to generate the pressure sensitivity curve by determining an ending value for the exponential curve function based on the input element value, wherein the ending value indicates an input pressure value at which the display output of the graphical user interface tool reaches a maximum value.

6. The non-transitory computer readable storage medium as recited in claim 1, further comprising instructions that, when executed by the at least one processor, cause the computing device to generate the pressure sensitivity curve by:
   setting a starting value corresponding to the display output of the graphical user interface, wherein the starting value indicates a minimum value for the display output; and
   determining a transition point between the starting value and the exponential curve function based on the input element value.

7. The non-transitory computer readable storage medium as recited in claim 1, further comprising instructions that, when executed by the at least one processor, cause the computing device to generate the pressure sensitivity curve by generating the pressure sensitivity curve with a starting value, an ending value, and a curve shape in a two-dimensional space in response to determining the input element value.

8. The non-transitory computer readable storage medium as recited in claim 1, further comprising instructions that, when executed by the at least one processor, cause the computing device to:
   determine, in response to an input to move the continuous-value input element to a new position, a new input element value corresponding to the new position of the continuous-value input element;
   determine a new exponent based on the new input element value; and
   generate a new pressure sensitivity curve utilizing the exponential curve function based on the new exponent.

9. The non-transitory computer readable storage medium as recited in claim 1, further comprising instructions that, when executed by the at least one processor, cause the computing device to:
   provide, for display within the graphical user interface, a plot comprising the pressure sensitivity curve with an editable power coefficient;
   receive an input to modify the editable power coefficient via the graphical user interface; and
   update the position of the continuous-value input element and the plot comprising the pressure sensitivity curve in response to the input to modify the editable power coefficient.

10. A system comprising:
    at least one computer memory device; and
    one or more servers configured to cause the system to:
       provide, for display within a graphical user interface, a continuous-value input element in connection with a pressure sensitivity of a touch-based input;
       determine an input element value corresponding to a position of the continuous-value input element;
       determine an exponential curve function comprising an exponent including a power coefficient based on the input element value;
       generate a pressure sensitivity curve utilizing the exponential curve function and an ending value for the exponential curve function, wherein the ending value for the exponential curve function is based on the power coefficient; and
       determine, according to the pressure sensitivity curve, a display output of a graphical user interface tool in response to a pressure of an input.

11. The system as recited in claim 10, wherein the one or more servers are further configured to cause the system to determine the exponential curve function by:
    determining a non-linear mapping between the power coefficient and a plurality of input element values;
    selecting, based on the input element value, the power coefficient from the non-linear mapping between the power coefficient and a plurality of input element values; and
    determining the exponential curve function based on the selected power coefficient.

12. The system as recited in claim 11, wherein the one or more servers are further configured to cause the system to:
    determine a first range of values for the power coefficient based on a first position range of the continuous-value input element by utilizing a first power coefficient function; and
    determining a second range of values for the power coefficient based on a second position range of the continuous-value input element by utilizing a second power coefficient function, wherein the first power coefficient function is different than the second power coefficient function.

13. The system as recited in claim 10, wherein the one or more servers are further configured to cause the system to generate the pressure sensitivity curve by:
    setting a starting value corresponding to the display output of the graphical user interface, wherein the starting value indicates a minimum value for the display output; and
    generating, based on the input element value, the pressure sensitivity curve to include a transition point from the starting value to the exponential curve function according to a value at which the exponential curve function crosses the starting value along a vertical axis within a two-dimensional plot of the pressure sensitivity curve.

14. The system as recited in claim 13, wherein the one or more servers are further configured to cause the system to:

generate the pressure sensitivity curve comprising the starting value, the ending value, and a curve shape corresponding to the exponential curve function in real-time in response to determining the input element value; and determine, in response to the pressure of the input, the display output by determining a value of the pressure sensitivity curve along the vertical axis in connection with the starting value, the ending value, and the curve shape corresponding to the exponential curve function.

15. The system as recited in claim 10, wherein the one or more servers are further configured to cause the system to:

determine, in response to an input to move the continuous-value input element to a new position, a new input element value corresponding to the new position of the continuous-value input element;

determine a new power coefficient based on the new input element value;

determine a new exponent based on the new power coefficient; and generate a new pressure sensitivity curve utilizing the exponential curve function based on the new exponent.

16. The system as recited in claim 10, wherein the continuous-value input element comprises a slider input element or a dial input element.

17. The system as recited in claim 10, wherein the one or more servers are further configured to cause the system to:

detect movement of the continuous-value input element in connection with an input to the graphical user interface; and provide, for display within the graphical user interface, a continuously updating representation of the pressure sensitivity curve according to the movement of the continuous-value input element.

18. A computer-implemented method comprising: providing, by at least one processor of a computing device for display within a graphical user interface, a continuous-value input element in connection with a pressure sensitivity of a touch-based input; determining, by the at least one processor, an input element value corresponding to a position of the continuous-value input element; generating, by the at least one processor, a pressure sensitivity curve utilizing an exponential curve function by determining an exponent based on the input element value; and determining, by the at least one processor according to the pressure sensitivity curve, a display output of a graphical user interface tool in response to a pressure of an input.

19. The computer-implemented method as recited in claim 18, further comprising:

determining, in response to an input to move the continuous-value input element to a new position, a new input element value corresponding to the new position of the continuous-value input element; and generating a new pressure sensitivity curve based on the new input element value.

20. The computer-implemented method as recited in claim 18, wherein determining the display output comprises modifying a visual characteristic of the display output according to a value of the pressure sensitivity curve corresponding to the pressure of the input.

* * * * *